(12) United States Patent
Suhm et al.

(10) Patent No.: US 7,816,456 B2
(45) Date of Patent: Oct. 19, 2010

(54) SEMICRYSTALLINE PROPYLENE POLYMER COMPOSITION FOR PRODUCING BIAXIALLY STRETCHED POLYPROPYLENE FILMS

(75) Inventors: Jürgen Suhm, Worms-Weninsheim (DE); Volker Rauschenberger, Eisenberg (DE); Dieter Lilge, Limburgerhof (DE); Roland Hingmann, Ladenburg (DE); Florian Stricker, Freiburg (DE)

(73) Assignee: Basell Polyolefine GmbH, Wesseling (DE)

( * ) Notice: Subject to any disclaimer, the term of this patent is extended or adjusted under 35 U.S.C. 154(b) by 336 days.

(21) Appl. No.: 11/624,606

(22) Filed: Jan. 18, 2007

(65) Prior Publication Data

US 2007/0117940 A1 May 24, 2007

Related U.S. Application Data

(63) Continuation of application No. 10/168,215, filed as application No. PCT/EP00/12511 on Dec. 11, 2000, now abandoned.

(30) Foreign Application Priority Data

Dec. 21, 1999 (DE) .................................. 19962130
Feb. 3, 2000 (DE) .................................. 10004660

(51) Int. Cl.
  C08L 23/10 (2006.01)
  C08L 23/12 (2006.01)
  C08L 23/14 (2006.01)
  C08F 4/6192 (2006.01)
(52) U.S. Cl. ..................... 525/240; 526/65; 526/160; 526/348; 526/943
(58) Field of Classification Search ............ 526/65, 526/160, 165, 348, 943; 525/240
  See application file for complete search history.

(56) References Cited

U.S. PATENT DOCUMENTS

| 4,794,096 | A | 12/1988 | Ewen |
| 5,286,552 | A | 2/1994 | Lesca et al. |
| 5,371,260 | A | 12/1994 | Sangokoya |
| 5,391,793 | A | 2/1995 | Marks et al. |
| 5,483,002 | A | 1/1996 | Seelert et al. |
| 5,747,621 | A | 5/1998 | Resconi et al. |
| 6,063,482 | A | 5/2000 | Peiffer et al. |
| 6,159,587 | A | 12/2000 | Perdomi |
| 6,444,774 | B1 | 9/2002 | Stahl et al. |
| 6,495,634 | B2 | 12/2002 | Huffer et al. |
| 6,759,500 | B1 | 7/2004 | Dolle et al. |
| 6,806,316 | B2 * | 10/2004 | Mehta et al. ................. 525/240 |

FOREIGN PATENT DOCUMENTS

| EP | 0 284 708 A1 | 10/1988 |
| EP | 0 444 671 A2 | 9/1991 |
| EP | 0 621 268 A1 | 10/1994 |
| EP | 0 621 279 A2 | 10/1994 |
| EP | 0 633 264 A1 | 1/1995 |
| EP | 0 643 100 A1 | 3/1995 |
| EP | 745 638 A1 | 12/1996 |
| EP | 0 887 357 A1 | 12/1998 |
| EP | 0 905 173 A1 | 3/1999 |
| WO | WO 91/09882 A1 | 7/1991 |
| WO | WO 94/13713 A1 | 6/1994 |
| WO | WO 96/20225 A2 | 7/1996 |
| WO | WO 98/10016 A1 | 3/1998 |
| WO | WO 98/56580 A1 | 12/1998 |
| WO | WO 98/59002 A1 | 12/1998 |
| WO | WO 99/06414 A1 | 2/1999 |
| WO | WO 99/58587 A1 | 11/1999 |

OTHER PUBLICATIONS

Mehta et al., Metallocene-catalyzed Polymers: Materials, Properties, Processing and Markets, "Potential Film Applications of Metallocene-based Propylene Polymers from . . . Exxpol ® Catalysts," 1998, pp. 261-270.
Wiesenfeld et al., J. Org. Chem., "ansa-Metallocene derivatives," 369, 1998, p. 359-370.
L. Wild, Adv. Poly. Sci., Temperature Rising Elution Fractionation, 98, 1990, p. 1-47.

* cited by examiner

*Primary Examiner*—Caixia Lu
(74) *Attorney, Agent, or Firm*—Novak Druce + Quigg LLP

(57) ABSTRACT

The present invention relates to a semicrystalline propylene polymer composition prepared by polymerizing propylene, ethylene and/or $C_4$-$C_{18}$-1-alkenes, where at least 50 mol % of the monomer units present stem from the polymerization of propylene and at least 20% by weight of the propylene polymer composition is the result of a polymerization using metallocene catalysts,
with a melting point $T_M$ of from 65 to 170° C.,
where the semicrystalline propylene polymer composition can be broken down into
from 65 to 85% by weight of a principal component A,
from 10 to 35% by weight of an ancillary component B and
from 0 to 25% by weight of an ancillary component C.

8 Claims, 1 Drawing Sheet

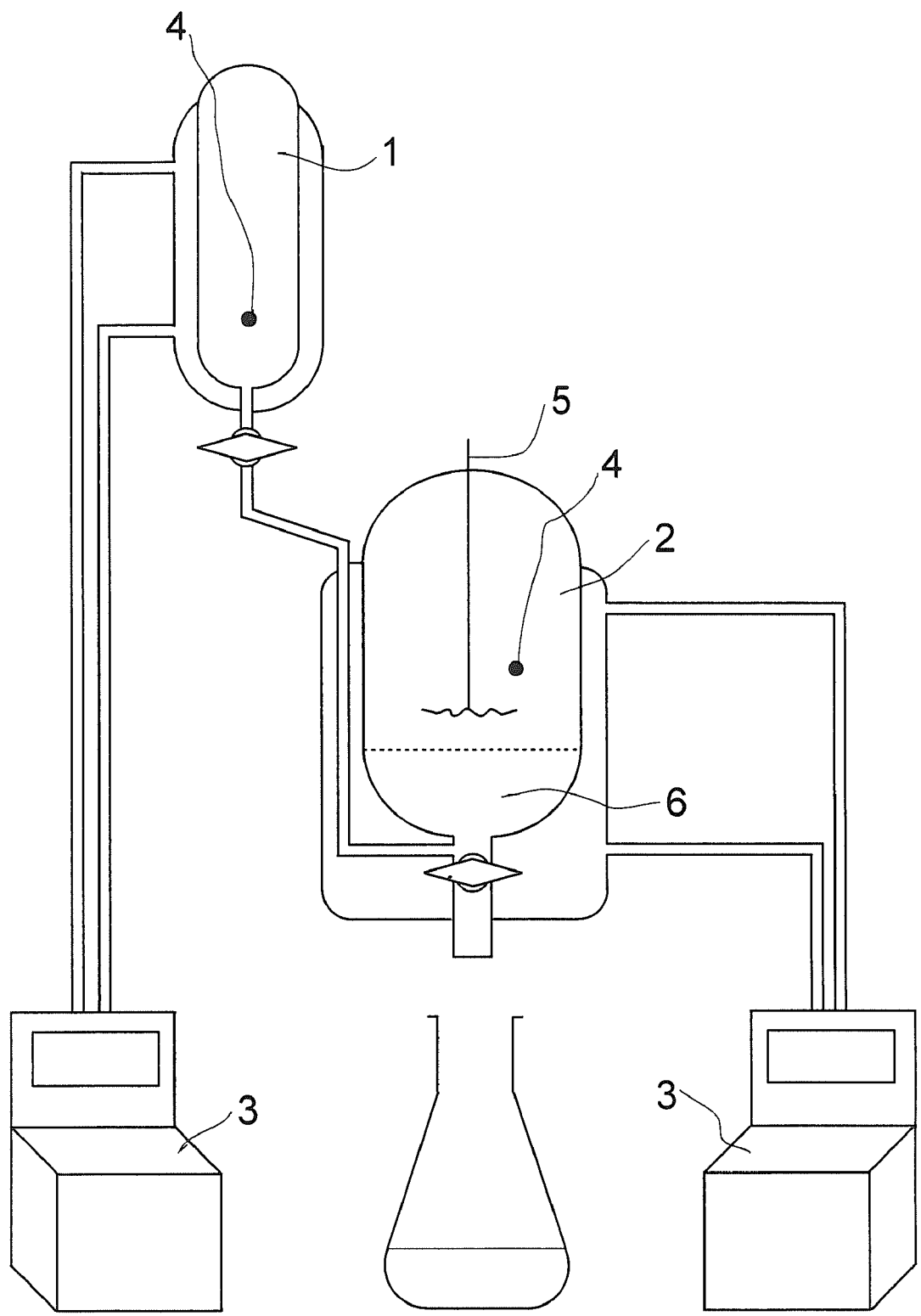

SEMICRYSTALLINE PROPYLENE POLYMER COMPOSITION FOR PRODUCING BIAXIALLY STRETCHED POLYPROPYLENE FILMS

This is a continuation application of application 10/168,215 filed Jun. 19, 2002 now abandoned, which is a national stage application filed under 35 U.S.C. §371 based on international application number PCT/EP00/12511 filed on Dec. 11, 2000, which is herewith incorporated by reference.

The present invention relates to a semicrystalline propylene polymer composition prepared by polymerizing propylene, ethylene and/or $C_4$-$C_{18}$-1-alkenes, where at least 50 mol % of the monomer units present stem from the polymerization of propylene and at least 20% by weight of the propylene polymer composition is the result of a polymerization using metallocene catalysts, with a melting point $T_M$ of from 65 to 170° C.,
where the melting point $T_M$ is measured in ° C. by differential scanning calorimetry (DSC) to ISO 3146 by heating a previously melted specimen at a heating rate of 20° C./min, and is the maximum of the resultant curve, and the semicrystalline propylene polymer composition can be broken down into from 65 to 85% by weight of a principal component A,
from 10 to 35% by weight of an ancillary component B and
from 0 to 25% by weight of an ancillary component C, where the proportions of components A, B and C are determined by carrying out TREF (temperature rising elution fractionation) in which the polymers are firstly dissolved in boiling xylene and the solution is then cooled at a cooling rate of 10° C./h to 25° C., and then, as the temperature rises, that fraction of the propylene polymer composition which is soluble in xylene at $(T_M/2)+7.5°$ C. is firstly dissolved and separated off from the remaining solid, and then, as the temperature rises, at all of the higher temperatures 70° C., 75° C., 80° C., 85° C., 90° C., 94° C., 98° C., 102° C., 107° C., 112° C., 117° C., 122° C. and 125° C., the fractions soluble within the temperature range between this elution temperature and the preceding elution temperature are eluted, and the fractions taken into consideration during the evaluation which follows are those whose proportion by weight is at least 1% by weight of the initial weight of the propylene polymer composition, and gel permeation chromatography (GPC) at 145° C. in 1,2,4-trichlorobenzene is used to measure the molar mass distribution of all of the fractions to be taken into consideration, and the principal component A is formed by all of the fractions which are eluted at above $(T_M/2)+7.5°$ C. and have an average molar mass $M_N$ [sic] (number average)$\leqq$120,000 g/mol, the ancillary component B is formed by the fraction which is eluted at $(T_M/2)+7.5°$ C., and the ancillary component C is formed by all of the fractions which are eluted at above $(T_M/2)+7.5°$ C. and have an average molar mass $M_N$ [sic] (number average)<120,000 g/mol.

The invention further relates to processes for preparing the semicrystalline propylene polymer composition, the use of the semicrystalline propylene polymer composition for producing films, fibers or moldings, and also to the films, fibers and moldings made from this composition.

The term polypropylene is generally understood to denote a wide variety of different polymers, a common feature of which is that they have been built up to a substantial extent from the monomer propylene. The various polypropylenes are generally obtained by coordinative polymerization on catalysts made from transition metals, which give predominantly ordered incorporation of the monomers into a growing polymer chain.

The polymer chains obtained during the polymerization of propylene with the usual coordination catalysts have a methyl side group on each second carbon atom. The polymerization therefore proceeds in a regioselective manner. Depending on the orientation of the monomers during incorporation into the chain, various stereochemical configurations are obtained. If the monomers all have the same arrangement when they are incorporated, the methyl side groups in the polymer chain are then all on the same side of the principal chain. The term used is isotactic polypropylene. If all of the monomers alternate in their spatial orientation when incorporated into the chain, the resultant polypropylene is termed syndiotactic. Both of these varieties with their stereoregular structures are semicrystalline and therefore have a melting point.

However, since the incorporation of the propylene monomers when coordination catalysts are used is not absolutely consistent, but some of the monomers are introduced in a way which differs from that of the majority, the polymer chains formed always have "defects" in the prevailing arrangement, and the number of these defects can vary considerably.

The longer the defect-free structure sequences in the polymer chains, the more readily the chains crystallize and therefore the higher are the crystallinity and the melting point of the polypropylene.

If the methyl side groups have an irregular stereochemical arrangement the polypropylenes are termed atactic. These are completely amorphous and therefore have no melting point.

The industrial preparation of polypropylene nowadays mostly uses heterogeneous catalysts based on titanium, and the resultant product is a predominantly isotactic polymer. These catalysts, for which the term Ziegler-Natta catalysts has become established, have a number of different centers active for polymerization. These centers differ both in their stereospecificity, i.e. in the number of "defects" which the resultant chains have, and also in the average molar mass of the chains formed. The predominant defects observed in all cases are stereo defects, implying that individual propylene monomers were incorporated syndiospecifically instead of isospecifically. The result of polymerization with heterogeneous catalysts of this type is therefore a mixture of various polymer chains which differ both in their stereochemistry and in their molar mass.

Metallocenes are compounds which are active in polymerization and, unlike Ziegler-Natta catalysts, have just one clearly definable polymerization center. The resultant polymer chains have uniform stereochemistry and also uniform molar mass. The polypropylenes formed by metallocene catalysts also differ from those from heterogeneous catalysts in that the predominant defects in the chain structure are not stereo defects but regio defects, so that in these polypropylenes it is no longer the case that precisely each second carbon atom carries a methyl side group.

The polypropylenes obtained by metallocene catalysis therefore allow the production of films, fibers or moldings with novel combinations of properties.

A significant application sector for polypropylenes is that of films, in particular biaxially stretched films, frequently also termed BOPP (biaxially oriented polypropylene) films.

A general aim of almost all developments in the polypropylene sector has been to reduce the soluble fractions of the polymers used. This is frequently possible via the use of optimized conventional Ziegler-Natta catalysts. The result is firstly an improvement in organoleptic properties, advantageous for applications in the medical and food sectors, and secondly a favorable effect on mechanical properties, in particular stiffness. However, polypropylenes of this type with reduced soluble fractions cannot be used for producing biaxially stretched polypropylene films, since they have low capability, or no capability, for processing to give these films.

Polymers prepared using metallocene catalysts have per se only a very low content of soluble fractions. There is therefore increased interest in finding propylene polymers which can readily be processed to give BOPP films and which have been obtained by polymerization using metallocene catalysts.

EP-A 745 638 discloses biaxially oriented polypropylene films whose base layer is composed of a polypropylene prepared using metallocene catalyst. This polypropylene centers on an isotactic block of length greater than 40, and has an n-heptane-soluble fraction of less than 1% and a narrow molar mass distribution.

EP-A 905 173 describes a process for producing biaxially oriented films using isotactic polypropylenes which contain at least 0.5% of 2,1-insertions, at least 96% of meso pentads and at least 99% of meso diads and which were prepared using a bridged metallocene complex containing substituted indene groups, and also describes the resultant biaxially oriented films.

Although the propylene polymers described in these documents and prepared using metallocenes allow the production of biaxially stretched films, their processability is still unsatisfactory. In particular, the processing latitude, i.e. the temperature range within which the production of biaxially stretched polypropylene films can proceed without disruption, is insufficient. One reason, inter alia, for desiring very good processing latitude is that the production process is then not excessively sensitive to temperature variation.

WO 98/10016 describes semicrystalline propylene polymer compositions which contain both a propylene homopolymer component and a propylene copolymer component. The propylene polymer compositions are prepared by using a metallocene catalyst system which comprises at least two different metallocenes, and the polymerization takes place in at least two stages, where in one stage the propylene homopolymer is prepared and in another stage the propylene copolymer is prepared with a small proportion of comonomer. Compared with normal metallocene polypropylenes, these compositions have broader molar mass distribution and broader composition distribution. (See also A. K. Mehta, M. C. Chen, J. J. McAlpin, "Potential Film Applications of Metallocene-based Propylene Polymers from Exxpol Catalysis", Eds.: G. M. Benedikt, B. L. Goodall, Plastic Design Library, 1998.) They are suitable for producing oriented films, have a relative good processing range and can be stretched at temperatures lower than those for conventional polypropylenes. However, a disadvantage is that the propylene polymer compositions are complicated to prepare. There is moreover a need for still better processing latitude.

It is an object of the present invention, therefore, to overcome the disadvantages described and to develop propylene polymer compositions which can readily be processed to give BOPP films and have a very high proportion of polymers prepared by metallocene catalysis. These polymers should be accessible via a very uncomplicated process, contain only a very small proportion of soluble fractions, have good processing latitude to give biaxially stretched films, and give BOPP films with good properties, in particular with high stiffness and good barrier action.

We have found that this object is achieved by means of the semicrystalline propylene polymer composition defined at the outset, and also by processes for preparing the semicrystalline propylene polymer composition, the use of the semicrystalline propylene polymer composition for producing films, fibers or moldings, and also the films, fibers and moldings made from this composition.

The novel semicrystalline propylene polymer composition is prepared by polymerizing propylene, ethylene and/or $C_4$-$C_{18}$-1-alkenes. For the purposes of the present invention, $C_4$-$C_{18}$-1-alkenes are linear or branched 1-alkenes which have from 4 to 18 carbon atoms. Preference is given to linear 1-alkenes. Particular examples are ethylene, 1-butene, 1-pentene, 1-hexene, 1-heptene and 1-octene, and mixtures made from these comonomers, and preference is given to the use of ethylene or 1-butene. The propylene polymer composition comprises at least 50 mol % of monomer units which stem from polymerization of propylene. It is preferable for the content of monomer units derived from propylene to be at least 70 mol %, and in particular at least 85 mol %. However, in preparing the novel propylene polymer composition it is also possible for propylene to have been the single monomer used, and the propylene polymer composition may therefore be a propylene homopolymer. If use has been made of one or more comonomers, the entire propylene polymer composition may have essentially the same comonomer distribution, as in a random copolymer. However, as in what are known as impact copolymers of propylene, there may also be a mixture of different components which have different comonomer contents.

According to the invention, at least 20% by weight of the propylene polymer composition are obtained by polymerization using metallocene catalysts. It is preferable for the proportion of the metallocene polypropylene to be at least 50% by weight and in particular at least 80% by weight. In one very particularly preferred embodiment, the polymerization of the entire propylene polymer composition is brought about by metallocene catalysts.

For the purposes of the present invention, metallocene catalysts are any of the catalyst systems which comprise at least one metallocene compound, and metallocenes here are any of the complex compounds of metals of transition groups of the Periodic Table with organic ligands, and these, together with metallocenium-ion-forming compounds, give effective catalyst systems.

Metallocene catalysts suitable according to the invention generally comprise, as active constituents, A) at least one metallocene complex of the formula (I)

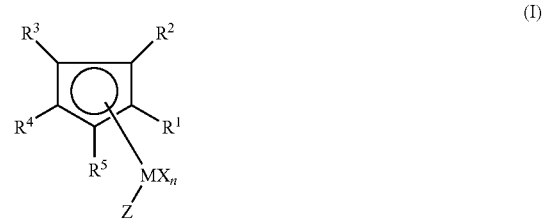

where:
M is titanium, zirconium, hafnium, vanadium, niobium or tantalum, or also elements of the 3rd subgroup of the Periodic Table or of the lanthanoids,
X is fluorine, chlorine, bromine, iodine, hydrogen, $C_1$-$C_{10}$-alkyl, $C_6$-$C_{15}$-aryl, alkylaryl having from 1 to 10 carbon atoms in the alkyl radical and from 6 to 20 carbon atoms in the aryl radical, —$OR^6$ or —$NR^6R^7$,
n is 1, 2 or 3, where n is the valence of M minus the number 2, where
- $R^6$ and $R^7$ are $C_1$-$C_{10}$-alkyl, $C_6$-$C_{15}$-aryl, alkylaryl, arylalkyl, fluoroalkyl or fluoroaryl having in each case from 1 to 10 carbon atoms in the alkyl radical and from 6 to 20 carbon atoms in the aryl radical, and the radicals X are identical or different,
- $R^1$ to $R^5$ are hydrogen, $C_1$-$C_{10}$-alkyl, 5- to 7-membered cycloalkyl, which in turn may be $C_1$-$C_{10}$-alkyl-substituted, $C_6$-$C_{15}$-aryl or arylalkyl, where two adjacent radicals together may also be saturated or unsaturated cyclic groups having from 4 to 15 carbon atoms, or $Si(R^8)_3$, where
- $R^8$ may be $C_1$-$C_{10}$-alkyl, $C_3$-$C_{10}$-cycloalkyl or $C_6$-$C_{15}$-aryl, and
- Z is X or

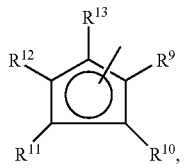

where
- $R^9$ to $R^{13}$ are hydrogen, $C_1$-$C_{10}$-alkyl, 5- to 7-membered cycloalkyl, which in turn may be $C_1$-$C_{10}$-alkyl-substituted, $C_6$-$C_{15}$-aryl or arylalkyl, where two adjacent radicals together may also be saturated or unsaturated cyclic groups having from 4 to 15 carbon atoms, or $Si(R^{14})_3$, where
- $R^{14}$ is $C_1$-$C_{10}$-alkyl, $C_3$-$C_{10}$-cycloalkyl or $C_6$-$C_{15}$-aryl, or where $R^4$ and Z together form a grouping —$R^{15}$-A-, where $R^{15}$ is

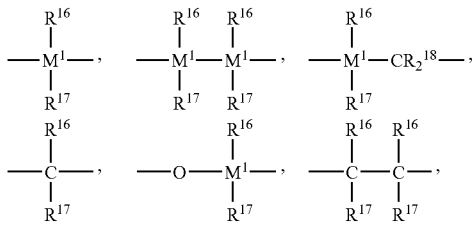

=$BR^{16}$, =$AlR^{16}$, —Ge—, —Sn—, —O—, —S—, =SO, =$SO_2$,
=$NR^{16}$, =CO, =$PR^{16}$ or =$P(O)R^{16}$, where
each of $R^{16}$, $R^{17}$ and $R^{18}$ is identical or different and is hydrogen, halogen, $C_1$-$C_{10}$-alkyl, $C_1$-$C_{10}$-fluoroalkyl, $C_6$-$C_{10}$-fluoroaryl, $C_6$-$C_{10}$-aryl, $C_1$-$C_{10}$-alkoxy, $C_2$-$C_{10}$-alkenyl, $C_7$-$C_{40}$-arylalkyl, $C_8$-$C_{40}$-arylalkenyl or $C_7$-$C_{40}$-alkylaryl, or where two adjacent radicals, in each case with the atoms linking them, form a saturated or unsaturated ring having from 4 to 15 carbon atoms, and
$M^1$ is silicon, germanium or tin,
A is

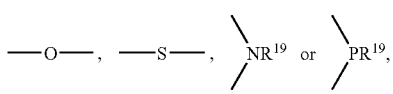

where
- $R^{19}$ is $C_1$-$C_{10}$-alkyl, $C_6$-$C_{15}$-aryl, $C_3$-$C_{10}$-cycloalkyl, $C_7$-$C_{18}$-alkylaryl or $Si(R^{20})_3$,
- $R^{20}$ is hydrogen, $C_1$-$C_{10}$-alkyl, $C_6$-$C_{15}$-aryl, which may in turn be substituted with $C_1$-$C_4$-alkyl groups, or is $C_3$-$C_{10}$-cycloalkyl, or where $R^4$ and $R^{12}$ together form a grouping —$R^{15}$—.

The radicals X in the formula (I) are preferably identical.
Among the metallocene complexes of the general formula (I), preference is given to

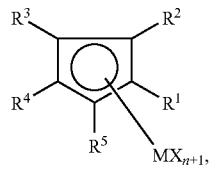

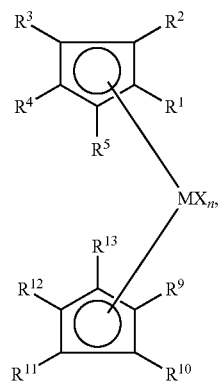

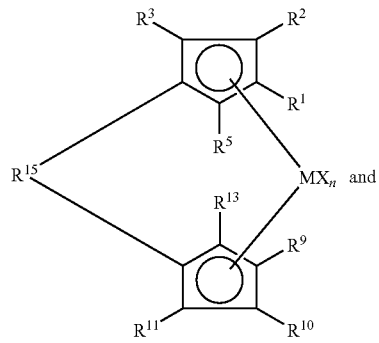

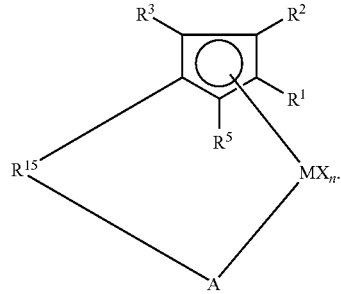

Among the compounds of the formula (Ia), preference is given in particular to those in which
M is titanium, zirconium or hafnium,
X is chlorine, $C_1$-$C_4$-alkyl or phenyl,
n is the number 2 and
$R^1$ to $R^5$ are hydrogen or $C_1$-$C_4$-alkyl.

Among the compounds of the formula (Ib), preference is given to those in which
M is titanium, zirconium or hafnium,
X is chlorine, $C_1$-$C_4$-alkyl or phenyl,
n is the number 2,
$R^1$ to $R^5$ are hydrogen, $C_1$-$C_4$-alkyl or $Si(R^8)_3$ and
$R^9$ to $R^{13}$ are hydrogen, $C_1$-$C_4$-alkyl or $Si(R^{14})_3$.

Particularly suitable compounds of the formula (Ib) are those in which the cyclopentadienyl radicals are identical.

Examples of particularly suitable compounds are:
bis(cyclopentadienyl)zirconium dichloride,
bis(pentamethylcyclopentadienyl)zirconium dichloride,
bis(methylcyclopentadienyl)zirconium dichloride,
bis(ethylcyclopentadienyl)zirconium dichloride,
bis(n-butylcyclopentadienyl)zirconium dichloride and
bis(trimethylsilylcyclopentadienyl)zirconium dichloride,
and also the corresponding dimethylzirconium compounds.

Particularly suitable compounds of the formula (Ic) are those in which
$R^1$ and $R^9$ are identical and are hydrogen or $C_1$-$C_{10}$-alkyl,
$R^5$ and $R^{13}$ are identical and are hydrogen, methyl, ethyl, isopropyl or tert-butyl,
$R^3$ and $R^{11}$ are $C_1$-$C_4$-alkyl and
$R^2$ and $R^{10}$ are hydrogen
or
two adjacent radicals $R^2$ and $R^3$, or also $R^{10}$ and $R^{11}$, together are a saturated or unsaturated cyclic group having from 4 to 12 carbon atoms,
$R^{15}$ is

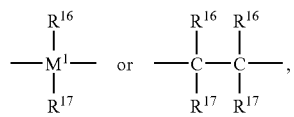

M is titanium, zirconium or hafnium, and
X is chlorine, $C_1$-$C_4$-alkyl or phenyl.

Examples of particularly suitable complex compounds (Ic) are
dimethylsilanediylbis(cyclopentadienyl)zirconium dichloride,
dimethylsilanediylbis(indenyl)zirconium dichloride,
dimethylsilanediylbis(tetrahydroindenyl)zirconium dichloride,
ethylenebis(cyclopentadienyl)zirconium dichloride,
ethylenebis(indenyl)zirconium dichloride,
ethylenebis(tetrahydroindenyl)zirconium dichloride,
tetramethylethylene-9-fluorenylcyclopentadienylzirconium dichloride,
dimethylsilanediylbis(3-tert-butyl-5-methylcyclopentadienyl)zirconium dichloride,
dimethylsilanediylbis(3-tert-butyl-5-ethylcyclopentadienyl)zirconium dichloride,
dimethylsilanediylbis(2-methylindenyl)zirconium dichloride,
dimethylsilanediylbis(2-isopropylindenyl)zirconium dichloride,
dimethylsilanediylbis(2-tert-butylindenyl)zirconium dichloride,
dimethylsilanediylbis(2-methylindenyl)zirconium dibromide,
dimethylsilanediylbis(3-methyl-5-methylcyclopentadienyl)zirconium dichloride,
dimethylsilanediylbis(3-ethyl-5-isopropylcyclopentadienyl)zirconium dichloride,
dimethylsilanediylbis(2-ethylindenyl)zirconium dichloride,
dimethylsilanediylbis(2-methyl-4,5-benzindenyl)zirconium dichloride,
dimethylsilanediylbis(2-ethyl-4,5-benzindenyl)zirconium dichloride,
methylphenylsilanediylbis(2-methyl-4,5-benzindenyl)zirconium dichloride,
methylphenylsilanediylbis(2-ethyl-4,5-benzindenyl)zirconium dichloride,
diphenylsilanediylbis(2-methyl-4,5-benzindenyl)zirconium dichloride,
diphenylsilanediylbis(2-ethyl-4,5-benzindenyl)zirconium dichloride, and
diphenylsilanediylbis(2-methylindenyl)hafnium dichloride,
and also the corresponding dimethylzirconium compounds.

Other examples of suitable complex compounds are
dimethylsilanediylbis(2-methyl-4-phenylindenyl)zirconium dichloride,
dimethylsilanediylbis(2-methyl-4-naphthylindenyl)zirconium dichloride,
dimethylsilanediylbis(2-methyl-4-isopropylindenyl)zirconium dichloride,
dimethylsilanediylbis(2-methyl-4,6-diisopropylindenyl)zirconium dichloride,
dimethylsilanediylbis(2-methyl-4[4'-tert-butylphenyl]indenyl)zirconium dichloride,
dimethylsilanediylbis(2-ethyl-4[4'-tert-butylphenyl]indenyl)zirconium dichloride,
dimethylsilanediylbis(2-propyl-4[4'-tert-butylphenyl]indenyl)zirconium dichloride, and
dimethylsilanediyl(2-isopropyl-4[4'-tert-butylphenyl]indenyl)(2-methyl-4[4'-tert-butylphenyl]indenyl)zirconium dichloride
and also the corresponding dimethylzirconium compounds.

Particularly suitable compounds of the general formula (Id) are those in which
M is titanium or zirconium,
X is chlorine, $C_1$-$C_4$-alkyl or phenyl.
$R^{15}$ is

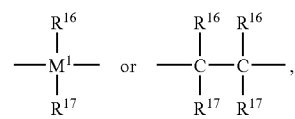

A is

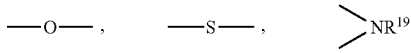

and
$R^1$ to $R^3$ and $R^5$ are hydrogen, $C_1$-$C_{10}$-alkyl, $C_3$-$C_{10}$-cycloalkyl, $C_6$-$C_{15}$-aryl or $Si(R^8)_3$, or where two adjacent radicals are a cyclic group having from 4 to 12 carbon atoms.

Complex compounds of this type may be synthesized by methods known per se. Preference is given to reacting the corresponding substituted cyclic hydrocarbon anions with halides of titanium, zirconium, hafnium, vanadium, niobium or tantalum.

Examples of corresponding preparation processes are described, inter alia, in the Journal of Organometallic Chemistry, 369 (1989), 359-370.

It is also possible to use mixtures of different metallocene complexes as component A).

The metallocene catalysts also comprise at least one metallocenium-ion-forming compound as compound B).

Examples of suitable metallocenium-ion-forming compounds B) are strong neutral Lewis acids, ionic compounds with Lewis-acid cations and ionic compounds with Brönsted acids as cations.

Preferred strong neutral Lewis acids are compounds of the general formula (II)

$$M^2X^1X^2X^3 \tag{II}$$

where

M² is an element of the 3rd main group of the Periodic Table, in particular B, Al or Ga, preferably B, and $X^1$, $X^2$ and $X^3$ are hydrogen, $C_1$-$C_{10}$-alkyl, $C_6$-$C_{15}$-aryl, alkylaryl, arylalkyl, haloalkyl or haloaryl with in each case from 1 to 10 carbon atoms in the alkyl radical and from 6 to 20 carbon atoms in the aryl radical or fluorine, chlorine, bromine or iodine, in particular haloaryl, preferably pentafluorophenyl.

Particular preference is given to compounds of the general formula (II), in which $X^1$, $X^2$ and $X^3$ are identical, preferably tris(pentafluorophenyl)borane.

Suitable ionic compounds with Lewis-acid cations are compounds of the general formula (III)

$$[(Y^{a+})Q_1Q_2\ldots Q_z]^{d+} \tag{III}$$

where

Y is an element of the 1st to 6th main group or of the 1st to 8th subgroup of the Periodic Table, $Q_1$ to $Q_z$ are radicals with a single negative charge, such as $C_1$-$C_{28}$-alkyl, $C_6$-$C_{15}$-aryl, alkylaryl, arylalkyl, haloalkyl, haloaryl with in each case from 6 to 20 carbon atoms in the aryl radical and from 1 to 28 carbon atoms in the alkyl radical, $C_3$-$C_{10}$-cyclo-alkyl, which may be unsubstituted or substituted with $C_1$-$C_{10}$-alkyl groups, or are halogen, $C_1$-$C_{28}$-alkoxy, $C_6$-$C_{15}$-aryloxy, silyl or mercaptyl, a is an integer from 1 to 6, z is an integer from 0 to 5, and d is the difference a-z, and is greater than or equal to 1.

Particularly suitable cations are carbonium cations, oxonium cations and sulfonium cations, and also cationic transition metal complexes. The triphenylmethyl cation, the silver cation and the 1,1'-dimethylferrocenyl cation should be mentioned in particular. They preferably have non-coordinating counterions, in particular boron compounds, as also mentioned in WO 91/09882, preferably tetrakis(pentafluorophenyl) borate.

Ionic compounds with Brönsted acids as cations and preferably likewise non-coordinating counterions are mentioned in WO 91/09882, and a preferred cation is N,N-dimethylanilinium.

The amount of strong neutral Lewis acids, of ionic compounds with Lewis-acid cations or of ionic compounds with Bröacids as cations is preferably from 0.1 to 10 equivalents, based on the metallocene complex A).

Particularly suitable metallocenium-ion-forming compounds B) are open-chain or cyclic aluminoxane compounds of the general formulae (IV) or (V)

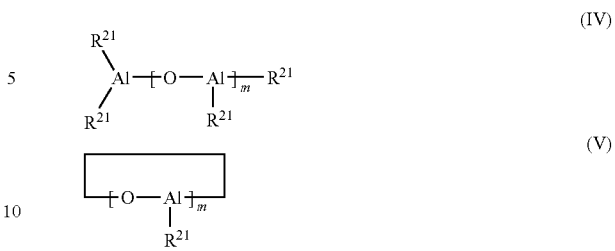

where $R^{21}$ is $C_1$-$C_4$-alkyl, preferably methyl or ethyl, and m is an integer from 5 to 30, preferably from 10 to 25.

These oligomeric aluminoxane compounds are generally prepared by reacting a solution of trialkylaluminum with water, as described, inter alia, in EP-A 284 708 and U.S. Pat. No. 4,794,096.

The oligomeric aluminoxane compounds thus obtained are generally mixtures of different linear and/or cyclic long-chain molecules, and m is therefore to be regarded as an average value. The aluminoxane compounds may also be present in a mixture with other metal alkyl compounds, preferably with alkylaluminum compounds.

It has proven advantageous to use amounts of the metallocene complexes A) and of the oligomeric aluminoxane compounds of the general formulae (IV) or (V) which give an atomic ratio of aluminum from the oligomeric aluminoxane compounds to transition metal from the metallocene complexes in the range from 10:1 to $10^6$:1, in particular from 10:1 to $10^4$:1.

It is moreover possible for the component B) used to be aryloxyaluminoxanes, as described in U.S. Pat. No. 5,391,793, amino-aluminoxanes, as described in U.S. Pat. No. 5,371,260, aminoaluminoxane hydrochlorides, as described in EP-A 633 264, siloxyaluminoxanes, as described in EP-A 621 279, or mixtures of these, instead of the aluminoxane compounds of the general formulae (IV) or (V).

Other suitable metallocenium-ion-forming compounds B) are the boron-aluminium compounds disclosed in WO 99/06414, for example di[bis(penta-fluorophenylboroxy)] methylalane. The boron-aluminium compounds used may also have been deposited onto an organic or inorganic support.

The metallocene complexes A), and also the metallocenium-ion-forming compounds B), are preferably used in solution, particular reference being given to aromatic hydrocarbons having from 6 to 20 carbon atoms, in particular xylenes and toluene.

Suitable metallocene catalysts may also comprise, as further component C), a metallic compound of the general formula (VI)

$$M^3(R^{22})_r(R^{23})_s(R^{24})_t \tag{VI}$$

where

M³ is an alkali metal, an alkaline-earth metal or a metal of the 3rd main group of the Periodic Table i.e. boron, aluminum, gallium, indium or thallium, $R^{22}$ is hydrogen, $C_1$-$C_{10}$-alkyl, $C_6$-$C_{15}$-aryl, alkylaryl or arylalkyl having in each case from 1 to 10 carbon atoms in the alkyl radical and from 6 to 20 carbon atoms in the aryl radical, $R^{23}$ and $R^{24}$ are hydrogen, halogen, $C_1$-$C_{10}$-alkyl, $C_6$-$C_{15}$-aryl, alkylaryl, arylalkyl or alkoxy having in each case from 1 to 10 carbon atoms in the alkyl radical and from 6 to 20 carbon atoms in the aryl radical, r is an integer from 1 to 3, and s and t are integers from 0 to 2, and the total r+s+t corresponds to the valence of $M^3$.

Among the metallic compounds of the general formula (VI), preference is given to those in which $M^3$ is lithium, magnesium or aluminum, and $R^{23}$ and $R^{24}$ are $C_1$-$C_{10}$-alkyl.

Particularly preferred metallic compounds of the formula (VI) are n-butyllithium, n-butyl-n-octylmagnesium, n-butyl-n-heptyl-magnesium, tri-n-hexylaluminum, tri-isobutylaluminum, triethyl-aluminum and trimethylaluminum.

If a metallic compound C) is used, it is preferably present in the catalyst system in an amount which gives a molar ratio of $M^3$ from formula (VI) to transition metal M from formula (I) of from 800:1 to 1:1, in particular from 500:1 to 50:1.

The metallocene complexes A) may also be used on a support material.

The support materials used are preferably finely divided supports which generally have a particle diameter in the range from 1 to 300 μm, in particular from 20 to 90 μm. Examples of suitable support materials are inorganic oxides of silicon, of aluminum, of titanium, or of one of the metals of the 1st or 2nd main group of the Periodic Table or mixtures of these oxides, among which, besides alumina and magnesium oxide and phyllosilicates, preference is in particular given to silica gel.

The support may also be subjected to treatment with heat, e.g. to remove adsorbed water, and treatment of this type is usually carried out at from 80 to 200° C., preferably from 100 to 150° C., or the support may be calcined. The support may also be treated chemically, generally using conventional drying agents, such as metal alkyl compounds, preferably aluminum alkyl compounds, chlorosilanes or $SiCl_4$.

Other suitable supports are fine-particle polyolefins, such as fine-particle polypropylene.

The metallocene catalyst systems may also be mixed with Ziegler catalysts, in the presence or absence of any of the monomers to be polymerized, and used in the olefin polymerization.

It is also possible, for example in suspension or in bulk procedures, for the catalysts to have been prepolymerized or preactivated.

The novel semicrystalline propylene polymer compositions have a melting point $T_M$ of from 65 to 170° C., preferably from 135 to 165° C. and in particular from 140 to 160° C.

For the purposes of the present invention, the melting point $T_M$ here is the temperature of the maximum in the graph of enthalpy against temperature resulting from differential scanning calorimetry (DSC) to ISO 3146 and obtained by heating a previously melted specimen at a heating rate of 20° C./min. The DSC measurement here is usually carried out by first heating the specimen at a heating rate of 20° C./min to about 40° C. above the melting point, and then allowing the specimen to undergo dynamic crystallization at a cooling rate of 20° C./min, and determining the melting point $T_M$ during a second heating procedure at a heating rate of 20° C./min.

The novel semicrystalline propylene polymer compositions have from 65 to 85% by weight, preferably from 70 to 80% by weight, of a principal component A, from 10 to 35% by weight, preferably from 10 to 25% by weight, of an ancillary component B, and from 0 to 25% by weight, preferably from 5 to 25% by weight, and in particular from 10 to 20% by weight, of an ancillary component C, where components A, B and C differ in their stereospecificity and in their molar mass.

To determine the proportions of components A, B and C in the semicrystalline propylene polymer compositions, according to the invention a fractionation is carried out using TREF (temperature rising elution fractionation) and the molar mass distribution of all of the fractions is then measured by gel permeation chromatography (GPC).

GPC and TREF are methods for using various physical properties to fractionate polymer specimens. While GPC fractionates polymer chains by their size, the separation in TREF is by crystallizability of the polymer molecules. The principle of temperature rising elution fractionation was described in detail in L. Wild, Advances in Polymer Sciences 98, 1-47 (1990), by way of example. In this technique, a polymer specimen is dissolved in a solvent at an elevated temperature, and the concentration of the solution should be below 2% by weight. The polymer solution is then cooled very slowly (about 0.1° C./min). The first polymer molecules to precipitate are then those which crystallize very well, and these are followed by molecules with poorer crystallization properties. In the polymer particles produced in the solvent, therefore, the crystallizability of the molecules of which these particles are composed decreases from the inside toward the outside. The cooling is followed by the actual fractionation by heating the polymer suspension. During this process, the molecules which crystallize poorly, located on the periphery of the polymer particles, are first dissolved at a relatively low temperature and are removed with the solvent which has dissolved them, followed at a higher temperature by the polymer chains which crystallize more readily.

The apparatus shown diagrammatically in FIG. 1 has proven particularly suitable for carrying out TREF. This is composed of a temperature-controllable storage tank (1), a temperature-controllable elution vessel (2), two thermostats (3) (type HC5 from Julabo, for example), two temperature sensors (4) and a high-performance mixer (5) with which the polymer suspension is mixed. In the lower part of the elution vessel, separated off by wire netting, there is glass wool (6) which prevents undissolved polymer particles from being discharged when polymer solutions are run off.

According to the invention, to characterize semicrystalline propylene polymer compositions the polymer is first dissolved in xylene. In principle it is possible here to use any xylene isomer, isomer mixture or isomer mixture with ethylbenzene content, and for economic reasons isomer mixtures are preferred. However, it is advantageous to avoid use of pure p-xylene and of isomer mixtures with a p-xylene content of more than about 50% by weight, since p-xylene freezes at about 20° C.

To dissolve the polymer specimen it is placed, for example, together with the solvent in a glass vessel with a magnetic stirrer rod, underneath a reflux condenser, and the glass vessel is then heated in a temperature-controllable bath with stirring until the polymer has dissolved completely. The polymer solution is then cooled, e.g. by dipping the glass vessel into the preheated oil bath of a thermostat system, at a cooling rate of 10° C./h until room temperature has been reached. The specified cooling may be achieved by appropriately programming a programmer associated with the thermostat system. 5 g of propylene polymer are usually dissolved in 400 ml of xylene for each TREF analysis.

The polymer suspension resulting from the specified crystallization procedure is transferred into the elution vessel (2)

of the apparatus shown in FIG. 1, the temperature is raised to $(T_M/2)+7.5°$ C. and the polymer crystals are extracted at this temperature for 15 minutes with vigorous mixing. The polymer solution is then run off, while the crystals remain in the extractor. The dissolved polymer is preferably precipitated in cold acetone (at <0° C.), filtered off and dried for from 4 to 5 hours at 100° C. in vacuo.

400 ml of xylene which has been temperature-controlled to the next higher of the temperatures 70° C., 75° C., 80° C., 85° C., 90° C., 94° C., 98° C., 102° C., 107° C., 112° C., 117° C., 122° C. and 125° C. are then added to the polymer crystals in the elution vessel (2), followed again by mixing for 15 minutes at this next higher temperature. This dissolves those fractions of the semicrystalline propylene polymer composition which are soluble within the temperature range between this elution temperature and the preceding elution temperature. The resultant solution is then run off, while the crystals remain in the extractor.

This process is repeated until all of the polymer crystals have been dissolved. This stage was achieved at 125° C. or below in the case of all the polypropylenes studied so far.

The dissolved polymers from each of the fractions are preferably precipitated in cold acetone (at <0° C.), filtered off and dried for from 4 to 5 hours at 100° C. in vacuo.

Since there are always some losses during the fractionation of any polymer composition, even though the losses may be slight, the amounts of the fractions generally give a total which is less than the initial weight of the polymer. This phenomenon can be ignored as long as at least 96% of the initial weight of the propylene polymer composition is retrieved in the fractions. However, if the loss is higher, the fractionation must be repeated.

It is also not possible to determine the molar mass distribution reliably if the amounts of specimen used are extremely small. To minimize error, the fractions to be taken into consideration in carrying out the evaluation which follows to calculate the amounts of components A, B and C are only those whose proportion of the initial polymer specimen weight is at least 1% by weight. The molar mass distribution of these fractions is determined by gel permeation chromatography (GPC) in 1,2,4-trichlorobenzene at 145° C., calibrating the GPC with polypropylene standards with molar masses of from 100 to $10^7$ g/mol.

The fractions can then be allocated to each of the components A, B and C according to the temperature at which the respective fraction was eluted, i.e. the temperature within the temperature sequence 70° C., 75° C., 80° C., 85° C., 90° C., 94° C., 98° C., 102° C., 107° C., 112° C., 117° C., 122° C. at which the polymer chains dissolved, and according to the average molar mass $M_n$ (number average) of the respective fraction.

The principal component A is formed by all of the fractions to be taken into consideration and which are eluted at above $(T_M/2)+7.5°$ C. and have an average molar mass $M_n$ (number average)$\geq$120,000 g/mol.

The ancillary component B is formed by the fraction which is eluted at $(T_M/2)+7.5°$ C. If the proportion of the fraction eluted at $(T_M/2)+7.5°$ C. is less than 1% by weight of the entire propylene polymer composition, the proportion of the ancillary component B is 0% by weight according to the definition given above for the fractions to be taken into consideration.

The ancillary component C is formed by all of the fractions to be taken into consideration which are eluted at above $(T_M/2)+7.5°$ C. and have an average molar mass $M_n$ (number average)<120,000 g/mol.

Because of the losses during TREF and because fractions whose proportion of the propylene polymer composition is less than 1% by weight are not given any further consideration, the amounts of components A, B and C obtained experimentally give a total which is less than the initial weight of polymer taken for fractionation and used as a basis. Since the proportions of components A, B and C are usually given in % by weight, the total of the proportions of components A, B and C therefore differs from 100% by weight. This difference may be termed Z and quantified by the formula $$Z = 100\% \text{ by weight} - (A+B+C)$$

where A, B and C are the ratio of the amounts found of components A, B and C to the initial weight of the propylene polymer composition in % by weight and z is also given in % by weight.

Surprisingly, particularly good processing to give BOPP films and a particularly high degree of processing latitude are given specifically by those semicrystalline propylene polymer compositions in which at least 20% by weight of the composition has been prepared by metallocene-catalyzed polymerization and which have the proportions according to the invention of components A, B and C. To explain the good properties of the novel propylene polymer compositions it may be assumed that in particular a high content of principal component A brings about high stiffness in the films. The content of ancillary component B affects the processing speed and the content of ancillary component C is responsible for a high degree of temperature latitude.

A significant factor for the properties of the novel propylene polymer composition is its proportion of components A, B and C. The chemical nature of the metallocene catalysts used according to the invention to prepare the propylene polymer composition implies that the composition is usually a mixture of polymers prepared under different polymerization conditions. The process by which this mixture has been prepared is not critical per se.

For example, it is possible to polymerize two or more starting polymers separately, then to mix these by using suitable mixing equipment, such as screw extruders or Diskpack plasticators, kneaders or roll mills.

However, it is preferable for the propylene polymer compositions not to be polymerized separately. One method is therefore to use a mixture of two or more different metallocenes which give different polypropylenes under the polymerization conditions used. One metallocene generally then forms component A and another forms components B and C, or one metallocene forms component A, another forms component B and a further metallocene forms component C. A second method is to use only one catalyst, but to carry out polymerization in different reactors, for example in a reactor cascade, with conditions sufficiently different to give the final composition desired.

The constituents of the novel propylene polymer composition, or of the entire propylene polymer composition, may be prepared in a known manner in bulk, in suspension or in the gas phase in the reactors usually used for polymerizing propylene, batchwise or preferably continuously, in one or more stages. The polymerization is generally carried out at from 20 to 150° C. and at a pressure of from 1 to 100 bar, with average residence times of from 0.5 to 5 hours, preferably at from 60 to 90° C. and at a pressure of from 20 to 35 bar, with average residence times of from 0.5 to 3 hours.

The novel semicrystalline propylene polymer composition preferably has a molar mass (weight average $M_w$) of from 20,000 to 900,000 g/mol. Its melt flow rate at 230° C. under a load of 2.16 kg to ISO 1133 is from 0.1 to 100 g/10 min, preferably from 0.5 to 50 g/10 min and in particular from 1 to 12 g/10 min.

It is usual for customary amounts of conventional additives, such as stabilizers, lubricants, mold-release agents, fillers, nucleating agents, antistats, plasticizers, dyes, pigments or flame retardants to be added to the novel semicrystalline propylene polymer composition prior to its use. These are usually incorporated into the polymer during pelletization of the polymerization product produced in pulverulent form.

The usual stabilizers are antioxidants, such as sterically hindered phenols, process stabilizers, such as phosphites or phosphonites, acid scavengers, such as calcium stearate, zinc stearate or dihydrotalcite, sterically hindered amines, or else UV stabilizers. The novel propylene polymer composition generally comprises amounts of up to 2% by weight of one or more of the stabilizers.

Examples of suitable lubricants and mold-release agents are fatty acids, the calcium or zinc salts of the fatty acids, fatty amides and low-molecular-weight polyolefin waxes, and these are usually used in concentrations of up to 2% by weight.

Examples of fillers which may be used for the propylene polymer composition are talc, chalk and glass fibers, and the amounts which may be used here are up to 50% by weight.

Examples of suitable nucleating agents are inorganic additives, such as talc, silica or kaolin, salts of mono- or polycarboxylic acids, such as sodium benzoate or aluminum tert-butylbenzoate, dibenzylidenesorbitol or its $C_1$-$C_8$-alkyl-substituted derivatives, such as methyl- or dimethyldibenzylidenesorbitol, and salts of diesters of phosphoric acid, such as sodium 2,2'-methylenebis(4,6-di-tert-butylphenyl)phosphate. The content of nucleating agents in the propylene polymer composition is generally up to 5% by weight.

Additives of this type are generally commercially available and are described, for example, in Gächter/Müller, Plastics Additives Handbook, 4th Edition, Hansa Publishers, Munich, 1993.

The novel semicrystalline propylene polymer composition features a very low proportion of soluble fractions, good barrier action, high stiffness, toughness and transparency, and also good processability to give biaxially stretched polypropylene films. These good performance characteristics make the novel semicrystalline propylene polymer composition especially suitable for producing films, fibers or moldings.

The invention also provides biaxially stretched films produced from the novel semicrystalline propylene polymer composition and having a longitudinal stretching ratio of at least 1:3 and a transverse stretching ratio of at least 1:5.

Biaxially stretched films may be produced by melt extrusion of the propylene polymer composition, whereupon the discharged melt is first cooled to between 100 and 20° C. for solidification, and the solidified film is then stretched longitudinally at from 80 to 150° C. with a stretching ratio of at least 1:3 and transversely at from 120 to 170° C. with a stretching ratio of at least 1:5.

To this end, the semicrystalline propylene polymer compositions are melted at from 220 to 300° C., preferably from 240 to 280° C., for example, in an extruder, where other additives or polymers may be added in the extruder, and the melt is extruded through a slot die or an annular die.

The resultant film is then solidified by cooling. By extrusion through a slot die (flat-film die) the cooling generally takes place via one or more take-off rolls whose surface temperature is from 10 to 100° C., preferably from 15 to 70° C., for example. If an annular die is used, the film bubble is usually cooled by air or water at from 0 to 40° C.

The resultant film is then stretched longitudinally and transversely to the direction of extrusion, orienting the molecular chains. The sequence of stretching is not critical. In flat-film-die extrusion the first stretching is generally longitudinal, carried out with the aid of two or more pairs of rolls running at different speeds corresponding to the desired stretching ratio. This is followed by transverse stretching using appropriate equipment comprising clips. It is also possible for the longitudinal and transverse stretching to take place simultaneously using suitable equipment comprising clips. If an annular die is used, stretching in both directions usually takes place simultaneously by injection of gas into the film bubble.

Prior to the stretching of the film, it may be heated to between 60 and 110° C., for example. The longitudinal stretching preferably takes place at from 80 to 150° C., in particular from 100 to 130° C., and the transverse stretching at from 120 to 190° C., in particular from 135 to 180° C. The longitudinal stretching ratio is generally at least 1:3, preferably from 1:4 to 1:7 and in particular from 1:4.5 to 1:5. The transverse stretching ratio is generally at least 1:5, preferably from 1:6 to 1:12 and in particular from 1:7 to 1:10.

The biaxial stretching may be followed by a heat treatment for thermosetting, in which the film is held at from 100 to 160° C. for from about 0.1 to 10 s. The film is then wound up in the usual manner by wind-up equipment.

During or after production of the BOPP film, one or both surfaces may be corona- or flame-treated by one of the known methods, or, if required, metalized, for example with aluminum.

It is also possible for the novel semicrystalline propylene polymer composition to form just one layer, or just some of the layers, of a multilayer biaxially stretched film.

The biaxially stretched films produced from the novel semicrystalline propylene polymer compositions have in particular excellent stiffness, excellent barrier action and excellent transparency.

EXAMPLES

The following tests were carried out to characterize the specimens:

Determination of average particle diameter:
To determine the average particle diameter of the silica gel, the particle size distribution of the silica gel particles was determined by Coulter Counter Analysis to ASTM D 4438 and the volume-based average (median) calculated from the results.

Determination of pore volume:
By mercury porosimetry to DIN 66133.

Determination of specific surface area:
By nitrogen adsorption to DIN 66131.

Determination of ethylene content:
The ethylene content was determined by $^{13}C$ NMR spectroscopy on polymer pellets.

Determination of melt flow rate (MFR):
To ISO 1133 at 230° C. under a load of 2.16 kg.

Determination of $T_M$:
The melting point $T_M$ was determined by DSC to ISO 3146 using a first heating procedure with a heating rate of 20° C. per minute to 200° C., dynamic crystallization at a cooling rate of 20° C. per minute to 25° C. and a second heating procedure with a heating rate of 20° C. per minute, again to 200° C. The melting point $T_M$ is then the temperature of the maximum in the plot of enthalpy against temperature measured during the second heating procedure.

TREF fractionation:

The solvent used comprised industrial xylene with less than 0.1% by weight of nonvolatile fractions, with 5 grams per liter of 2,6-di-tert-butyl-4-methylphenol added as stabilizer. For each fractionation, 5 g of the propylene polymer composition were dissolved in 400 ml of boiling xylene, and the solution was then cooled linearly at a cooling rate of 10° C./h to 25° C., whereupon most of the polymer precipitated.

The crystalline suspension was transferred into the 500 ml temperature-controllable extraction apparatus shown in FIG. 1 and heated to the first elution temperature: $(T_M/2)+7.5°$ C. Before measurements were made the entire apparatus was flushed with nitrogen. The gas space above the extraction liquids remained under nitrogen during the extraction. The polypropylene crystals were extracted for 15 minutes at this temperature with vigorous mixing. The polymer solution was then run off, while the polypropylene crystals remained in the extractor. The dissolved polymer was precipitated in cold acetone (<0° C.), filtered off and dried for from 4 to 5 hours at 100° C. in vacuo.

The extractor was then heated to the next elution temperature in the temperature sequence 70° C., 75° C., 80° C., 85° C., 90° C., 94° C., 98° C., 102° C., 107° C., 112° C., 117° C., 122° C. and 400 ml of xylene at the same temperature were added. Extraction was repeated for 15 minutes with vigorous mixing, the polymer solution was run off, and the dissolved polymer was precipitated in cold acetone, filtered off and dried. These steps were repeated until all of the propylene homopolymer had dissolved.

The content calculated for each TREF fraction gives the content which has dissolved during the extraction at the temperature given. The % by weight data here are based on the initial sample weight of 5 g. As a result of losses during weighing and filtration, therefore, the total of the fractions is in each case not quite 100% by weight.

Gel permeation chromatography (GPC):

The gel permeation chromatography (GPC) at 145° C. was carried out at 145° C. in 1,2,4-trichlorobenzene using a Waters 150C GPC apparatus. The data were evaluated using Win-GPC software from HS-Entwicklungsgesellschaft für wissenschaftliche Hard-und Software mbH, Ober-Hilbersheim, Germany. The columns were calibrated using polypropylene standards with molar masses of from 100 to $10^7$ g/mol.

The weight-average ($M_w$) and number-average ($M_n$) molar masses of the polymers were determined. The value Q is the ratio of the weight average ($M_w$) to the number average ($M_n$).

Determination of the proportions of components A, B and C:

A TREF analysis was carried out with the propylene polymer composition to be studied. In the evaluation which followed, the fractions taken into consideration were all of those whose proportion by weight was more than 1%. The molar mass distribution of all of the fractions to be taken into consideration was determined using GPC.

The proportion by weight of the ancillary component B is the proportion by weight of the fraction which was obtained at the first elution temperature, i.e. at $(T_M/2)+7.5°$ C.

The proportion by weight of the principal component A is the proportion by weight of all of the fractions obtained at higher elution temperatures and having an average molar mass $M_n$ (number average) $\geq$ 120,000 g/mol.

The ancillary component C is formed by all of the fractions obtained at temperatures higher than $(T_M/2)+7.5°$ C. and having an average molar mass $M_n$ (number average) <120,000 g/mol.

The difference Z, where $$Z = 100\% \text{ by weight} - (A+B+C)$$

quantifies those fractions of the propylene polymer composition initially weighed which were not taken into consideration in calculating the amounts of components A, B and C because of losses occurring during TREF or because the amounts of particular fractions were below the limit.

Determination of processing latitude:

During production of the BOPP films the stretching temperature was varied to determine the temperature range within which BOPP films can be obtained. This temperature range has a higher-temperature limit resulting from tearing of the film due to melting, and has a lower-temperature limit resulting from tearing of the film due to inhomogeneity caused by incomplete melting, or from solidification of the film to the extent that it slips out of the orienting equipment.

The procedure began at a processing temperature which ensured stable running. The stretching temperature was then raised in steps of 2° C. until the film tore. The next temperature was set here as soon as 1000 m of film could be produced at one temperature without tearing. Then, again starting at the initial temperature, the stretching temperature was lowered in steps of 2° C. until the film again tore or slipped out of the orienting equipment.

Determination of modulus of elasticity (tensile modulus of elasticity):

Longitudinal and transverse strips of width 15 mm were cut out from biaxially stretched films and used to determine the tensile modulus of elasticity to ISO 527-2 at 23° C.

Determination of haze:

To ASTM D-1003.

Determination of water vapor barrier properties:

$H_2O$ permeability measured to DIN 53122.

Determination of oxygen barrier properties:

$O_2$ permeability measured to ASTM D3985-81.

Example 1 a) Preparation of the Solid Catalyst 4000 g of fine-particle spherical silica gel ($SiO_2$) with an average particle diameter of 50 μm, a pore volume of 1.56 cm$^3$/g, and a specific surface area of 310 m$^2$/g, previously dried at 130° C. and 10 mbar for 8 hours, was suspended in 20 liters of heptane and mixed with 8 liters of a 2 M solution of triisobutylaluminum in heptane. The addition took place sufficiently slowly for the temperature of the suspension to remain always below 40° C. The mixture was then stirred for 2-hours and the suspension allowed to settle, and the supernatant liquor was removed. The solid was taken into suspension using 20 liters of toluene and briefly agitated. The suspension was then again allowed to settle and the supernatant liquor removed. This procedure was repeated two further times. The deactivated support was finally suspended in 20 liters of toluene, mixed with 256.6 g (80 μmol/g of $SiO_2$) of N,N-dimethylanilinium tetrakis(pentafluorophenyl)borate and heated to 85° C. The suspension was stirred for 30 minutes at this temperature. 50.3 g (20

µmol/g of $SiO_2$) of rac-dimethylsilanediylbis-(2-methyl-4-phenylindenyl)zirconium dichloride were then added. The mixture was then stirred for a further 90 minutes at 85° C. During this, the color of the suspension altered first from white to turquoise and then to blackish violet. The catalyst was then dried at 85° C. in vacuo.

This gave about 5000 g of a free-flowing powder which comprised 0.15% of Zr, 3.2% of Al and 36% by weight of Si.

b) Polymerization

The polymerization was carried out in a cascade of two vertically agitated gas-phase reactors each with a usable volume of 200 l, connected in series. Both reactors comprised a moving solid bed of fine-particle polymer.

Gaseous propylene was introduced into the first gas-phase reactor and continuously polymerized at 28 bar and 80° C. The catalyst used comprised the solid obtained in Example 1 a), and the amount of catalyst fed in was judged so that the average output from the cascade was maintained at 25 kg of polypropylene per hour. 30 ml of a 2 M solution of triisobutylaluminum in heptane and 40 g per hour of a 1% strength by weight solution of Atmer® 163 (ICI) in heptane were also fed into the reactor.

The propylene homopolymer obtained in the first gas-phase reactor was transferred, together with catalyst constituents which were still active, into the second gas-phase reactor, in which a mixture of propylene and ethylene was continuously polymerized at 15 bar and 65° C. The partial pressure ratio of propylene to ethylene was 12:1. A steady concentration of the monomers used was obtained in the gas phase by using a gas chromatograph at intervals of 5 minutes to determine the composition of the gas and regulating the concentration by supplementing with the required amounts of monomer. The ratio of the weight of the monomers reacted in the first polymerization stage to that of the monomers reacted in the second stage was 4:1.

The catalyst productivity was 5000 g of polypropylene per gram of solid catalyst used.

During pelletization, a stabilizer conventionally used for propylene polymers and based on tetrakis[methylene (3,5-di-tert-butylhydroxyhydrocinnamate)]methane and tris(2,4-di-tert-butylphenyl)phosphite was incorporated. The resultant propylene polymer composition had a melting point of 154° C., and a melt flow rate of 2.7 g/10 min, and contained 1.9% by weight of ethylene. GPC gave $M_w$ as 350,000 g/mol, $M_n$ as 95,000 g/mol and Q (=$M_w/M_n$) as 3.7. TREF was used to break down the composition into the fractions given in Table 1. The yield from the fractionation, i.e. the total of the proportions of the fractions by weight, was 98.7% by weight.

TABLE 1

| Fraction | Elution temperature [° C.] | Proportion by weight [% by weight] | Average molar mass of fraction (number average $M_N$ [sic]) [g/mol] |
| --- | --- | --- | --- |
| 1 | 84.5 | 13.1 | 36,500 |
| 2 | 85 | 1.3 | 74,800 |
| 3 | 90 | 11.7 | 105,100 |
| 4 | 94 | 34.3 | 146,300 |
| 5 | 98 | 9.9 | 147,900 |
| 6 | 102 | 28.4 | 211,000 |

Since $(T_M/2)+7.5°$ C. for the propylene polymer composition studied was 84.5° C., the first fraction was eluted at this temperature. Fractions 2 and 3 at 85 and 90° C. correspond to component C, and fractions 4-6 at 94, 98 and 102° C. correspond to component A. The makeup of the composition was therefore principal component A: 72.6% by weight
ancillary component B: 13.1% by weight, and
ancillary component C: 13.0% by weight.

The difference Z was therefore 1.3% by weight.

c) Production of a BOPP Film

The semicrystalline propylene polymer composition obtained was used to produce a biaxially stretched film of thickness about 20 µm. The film was produced on a Brückner Maschinenbau pilot plant with a 30 cm flat-film die. The throughput was 150 kg/h. The extruded film was cooled to 20° C. and the solidified film stretched longitudinally at 116° C. with a setting ratio of 4.5:1, and transversely at 157° C. with a stretching ratio of 8:1. The properties of the biaxially stretched film produced can be found in Table 7 below.

Comparative Example A a) Preparation of the Solid Catalyst

The solid catalyst prepared in Example 1 a) was used.

b) Polymerization

Using the solid catalyst prepared in Example 1 a), a propylene homopolymer was prepared in the first reactor of the reactor cascade also used in Example 1 b), under identical reaction conditions. The product obtained in the first gas-phase reactor was discharged directly.

The resultant polymer was stabilized as in Example 1 b) and had a melt temperature of 155° C. and a melt flow rate of 1.7 g/10 min. GPC gave $M_w$ as 500,000 g/mol, $M_n$ as 250,000 g/mol and Q (=$M_w/M_n$) as 2.0. It was broken down by TREF into the fractions given in Table 2. The yield from the fractionation, i.e. the total of the portions of the fractions by weight, was 99.4% by weight.

TABLE 2

| Fraction | Elution temperature [° C.] | Proportion by weight [% by weight] | Average molar mass of fraction (number average $M_N$ [sic]) [g/mol] |
| --- | --- | --- | --- |
| 1 | 85 | 0.6 | — |
| 2 | 90 | 5.8 | 137,400 |
| 3 | 94 | 3.4 | 131,300 |
| 4 | 98 | 5.5 | 140,100 |
| 5 | 102 | 75.0 | 284,400 |
| 6 | 107 | 9.1 | 196,800 |

Since $(T_M/2)+7.5°$ C. for the propylene polymer composition studied was 85° C., the first fraction was eluted at 85° C. Since the proportion of this fraction by weight was less than 1% by weight, the content of component B according to the definition was 0% by weight. Fractions 2-6 at 90, 94, 102 and 107° C. should all be allocated to component A and therefore the figure for component C is again 0% by weight. This therefore gives principal component A: 98.8% by weight
ancillary component B: 0% by weight, and
ancillary component C: 0% by weight.

The difference Z is therefore 1.2% by weight.

c) Production of a BOPP Film

The semicrystalline propylene polymer composition obtained was used to produce a biaxially stretched film of thickness about 20 μm. The film was produced on a Brückner Maschinenbau pilot plant with a 30 cm flat-film die. The throughput was 150 kg/h. The extruded film was cooled to 20° C. and the solidified film stretched longitudinally at 116° C. with a setting ratio of 4.5:1, and transversely at 157° C. with a stretching ratio of 8:1. The properties of the biaxially stretched film produced can be found in Table 7 below.

Example 2 a) Preparation of the Solid Catalyst

The procedure described in Example 1 a) was repeated under identical conditions. However, a suspension of 32.5 g (14 μmol/g of $SiO_2$) of rac-dimethylsilanediylbis (2-methyl-4-phenylindenyl)zirconium dichloride and 11.3 g (6 μmol/g of $SiO_2$) of rac-dimethylsilanediylbis (2-methylindenyl)zirconium dichloride in 1 liter of toluene was used instead of the rac-dimethylsilanediylbis(2-methyl-4-phenylindenyl)zirconium dichloride used in Example 1 a). The molar ratio of the metallocenes was therefore 70:30.

This gave about 5000 g of a free-flowing powder which comprised 0.14% by weight of Zr, 3.3% by weight of Al and 36% by weight of Si.

b) Polymerization

A monomer mixture of propylene and ethylene was polymerized in a continuously operated, vertically agitated gas-phase reactor with a useful volume of 200 l which comprised a stirred solid bed made from fine-particle polymer, using the solid catalyst described in Example 2 a), at 80° C. under a pressure of 28 bar. A steady concentration of the monomers used was obtained in the gas phase by using a gas chromatograph at intervals of 5 minutes to determine the composition of the gas and regulating the concentration by supplementing with the required amounts of monomer. The amount of solid catalyst fed was judged so that the average output from the cascade was maintained at 20 kg of polypropylene per hour. 30 ml of a 2 M solution of triisobutylaluminum in heptane and 40 g per hour of a 1% strength by weight solution of Atmer® 163 (ICI) in heptane were also fed into the reactor.

The catalyst productivity was 5000 g of polypropylene per gram of solid catalyst used.

The resultant polymer was stabilized as in Example 1 b) and had a melting point of 153.8° C., and a melt flow rate of 1.7 g/10 min, and comprises 1.9% by weight of ethylene. GPC gave $M_w$ as 560,000 g/mol, $M_n$ as 160,000 g/mol and Q (=$M_w/M_n$) as 3.5. It was broken down by TREF into the fractions given in Table 3. The yield from the fractionation, i.e. the total of the proportions of the fractions by weight, was 98.9% by weight.

TABLE 3

| Fraction | Elution temperature [° C.] | Proportion by weight [% by weight] | Average molar mass of fraction (number average $M_N$[sic]) [g/mol] |
|---|---|---|---|
| 1 | 84.4 | 20.4 | 41,000 |
| 2 | 85 | 1.6 | 41,500 |
| 3 | 90 | 45.9 | 155,700 |
| 4 | 94 | 10.4 | 149,800 |
| 5 | 98 | 9.4 | 149,200 |
| 6 | 102 | 11.2 | 187,900 |

Since $(T_M/2)+7.5°$ C. for the propylene polymer composition studied was 84.4° C., the first fraction was eluted at this temperature. Fraction 2 at 85° C. corresponds to component C and fractions 3-6 at 90, 94, 98 and 102° C. correspond to component A. This gives the following makeup for the composition principal component A: 76.9% by weight ancillary component B: 20.4% by weight, and ancillary component C: 1.6% by weight.

The difference Z is therefore 1.1% by weight.

c) Production of a BOPP Film

The semicrystalline propylene polymer composition obtained was used to produce a biaxially stretched film of thickness about 20 μm. The film was produced on a Brückner Maschinenbau pilot plant with a 30 cm flat-film die. The throughput was 150 kg/h. The extruded film was cooled to 20° C. and the solidified film stretched longitudinally at 116° C. with a setting ratio of 4.5:1, and transversely at 157° C. with a stretching ratio of 8:1. The properties of the biaxially stretched film produced can be found in Table 7 below.

Comparative Example B a) Preparation of the Solid Catalyst

The procedure described in Example 2 a) was repeated under the same conditions. However, a suspension of 25.1 g (10 μmol/g of $SiO_2$) of rac-dimethylsilanediylbis (2-methyl-4-phenylindenyl)zirconium dichloride and 18.8 g (10 μmol/g of $SiO_2$) of rac-dimethylsilanediylbis (2-methylindenyl)zirconium dichloride in 1 liter of toluene was used, i.e. the molar ratio of the metallocenes was 50:50.

This gave about 5000 g of a free-flowing powder which comprised 0.15% by weight of Zr, 3.3% of Al and 36% by weight of Si.

b) Polymerization

The polymerization took place in the reactor cascade used in Example 1 b) under the same conditions. However, the solid catalyst prepared in Example B a) was used.

The resultant polymer was stabilized as in Example 1 b) and had a melting point of 146° C., and a melt flow rate of 5.7 g/10 min, and comprised 3.1% by weight of ethylene. GPC gave $M_w$ as 250,000 g/mol, $M_n$ as 111,000 g/mol, and Q (=$M_w/M_n$) as 2.3. It was broken down by TREF into the fractions given in Table 4. The yield from the fractionation, i.e. the total of the proportions of the fractions by weight, was 99.9% by weight.

TABLE 4

| Fraction | Elution temperature [° C.] | Proportion by weight [% by weight] | Average molar mass of fraction (number average $M_N$ [sic]) [g/mol] |
|---|---|---|---|
| 1 | 80.5 | 48.0 | 43,500 |
| 2 | 85 | 12.0 | 62,000 |
| 3 | 90 | 4.0 | 88,500 |
| 4 | 94 | 6.8 | 101,600 |
| 5 | 98 | 12.7 | 189,000 |
| 6 | 102 | 15.5 | 180,500 |

Since $(T_M/2)+7.5°$ C. for the propylene composition studied was 80.5° C., the first fraction was eluted at this temperature. Fractions 2-4 at 85, 90 and 94° C., correspond to component C, and fractions 5 and 6, at 98 and 102° C., correspond to component A. The makeup of the composition was therefore as follows principal component A: 28.2% by weight
ancillary component B: 48.0% by weight, and
ancillary component C: 22.8% by weight.

The difference Z was therefore 1.0% by weight.

c) Production of a BOPP Film

The semicrystalline propylene polymer composition obtained was used to produce a biaxially stretched film of thickness about 20 μm. The film was produced on a Brückner Maschinenbau pilot plant with a 30 cm flat-film die. The throughput was 150 kg/h. The extruded film was cooled to 20° C. and the solidified film stretched longitudinally at 116° C. with a setting ratio of 4.5:1, and transversely at 150° C. with a stretching ratio of 8:1. The properties of the biaxially stretched film produced can be found in Table 7 below.

Comparative Example C a) Preparation of the Solid Catalyst

The solid catalyst prepared in Comparative Example B a) was used.

b) Polymerization

The polymerization took place in the reactor used in Example 2 b) under the same conditions. However, the solid catalyst prepared in Example B a) was used.

The resultant polymer was stabilized exactly as in Example 1 b) and has a melting point of 151.3° C., and a melt flow rate of 1.3 g/10 min. GPC gave $M_w$ as 480,000, $M_n$ as 110,000 g/mol and Q $(=M_w/M_n)$ as 4.4. It was broken down by TREF into the fractions given in Table 5. The yield from the fractionation, i.e. the total of the proportions of the fractions by weight, was 98.9% by weight.

TABLE 5

| Fraction | Elution temperature [° C.] | Proportion by weight [% by weight] | Average molar mass of fraction (number average $M_N$ [sic]) [g/mol] |
|---|---|---|---|
| 1 | 83.15 | 10.4 | 70,000 |
| 2 | 85 | 7.3 | 74,000 |
| 3 | 90 | 17.3 | 108,000 |
| 4 | 94 | 5.7 | 92,500 |
| 5 | 98 | 5.1 | 189,400 |
| 6 | 102 | 5.7 | 198,500 |

TABLE 5-continued

| Fraction | Elution temperature [° C.] | Proportion by weight [% by weight] | Average molar mass of fraction (number average $M_N$ [sic]) [g/mol] |
|---|---|---|---|
| 7 | 107 | 45.4 | 200,400 |
| 8 | 112 | 2.0 | 238,900 |

Since $(T_M/2)+7.5°$ C. for the propylene polymer composition studied was 83.15° C., the first fraction was eluted at this temperature. Fractions 2-4, at 85.90 and 94° C., correspond to component C, and fractions 5-8, at 98, 102, 107 and 112° C., correspond to component A. The makeup of the composition was therefore as follows principal component A: 58.2% by weight
ancillary component B: 10.4% by weight, and
ancillary component C: 30.3% by weight.

The difference Z was therefore 1.1% by weight.

Comparative Example D a) Preparation of the Solid Catalyst 1000 g of silica gel (SG 332, pore diameter 50 μm, Grace; scalded in vacuo (1 mbar) at 180° C. for 8 h) was suspended in 5 l of toluene under $N_2$. 7.75 l (6.38 kg) of 1.53 molar methylaluminoxane solution (in toluene, Witco) were added over a period of 120 minutes at 18° C. This was followed by stirring for 7 h at RT (room temperature) and filtration, and the filter cake was washed twice, each time with 2.5 l of toluene. This was followed by drying in vacuo. 1 kg of the resultant MAO-loaded silica was placed into an evacuated vessel. A solution of 5.8 g (10 mmol) of rac-dimethylsilane-diylbis(2-methyl-4,5-benzindenyl)zirconium dichloride in 1.32 l of 1.53 molar MAO solution (in toluene, Witco) was added, with stirring. Pressure equalization with $N_2$ was followed by 30 minutes of mixing at RT (room temperature). Most of the solvent was then distilled off in vacuo, initially at 20° C. (until no more solvent passed over). The temperature was then increased in 5° C. steps to 55° C. and the catalyst dried until it was an orange, free-flowing pulverulent residue.

b) Polymerization 30 mmol of triisobutylaluminum (TIBA; 15 ml of a 2 M solution in heptane), 500 mg of a 1% strength by weight solution of Atmer® 163 (ICI) in heptane and 3500 g of liquid propylene formed an initial charge in a dry, $N_2$-flushed 10 l autoclave. The autoclave was heated to 65° C., with stirring. At this temperature ethylene was fed in in a manner which gave a rise of pressure of 1 bar above the propylene pressure. The reactor was then cooled to room temperature, and at this temperature 521 mg of supported catalyst was added via a valve with $N_2$, and the autoclave heated to 65° C. After 60 minutes of reaction time the polymerization was terminated by discharging the remaining propylene, and the product discharged via a valve in the base. This gave 2300 g of polymer granules which had a melting point of 128° C., a melt flow rate of 350 g/10 min and an ethylene content of 2.4% by weight. GPC gave $M_w$ as 90,000 g/mol, $M_n$ as 45,000 g/mol and Q $(=M_w/M_n)$ as 2.0. It was broken down by TREF into the fractions given in Table 6. The yield from the fractionation, i.e. the total of the proportions of the fractions by weight, was 98.7% by weight.

TABLE 6

| Fraction | Elution temperature [° C.] | Proportion by weight [% by weight] | Average molar mass of fraction (number average $M_N$ [sic]) [g/mol] |
|---|---|---|---|
| 1 | 71.5 | 18.7 | 28,200 |
| 2 | 75 | 10.1 | 39,400 |
| 3 | 80 | 7.8 | 53,800 |
| 4 | 85 | 3.2 | 80,500 |
| 5 | 90 | 18.9 | 78,500 |
| 6 | 94 | 22.1 | 91,000 |
| 7 | 98 | 15.7 | 121,000 |
| 8 | 102 | 2.2 | 128,900 |

Since $(T_M/2)+7.5°$ C. for the propylene polymer composition studied was 71.5° C., the first fraction was eluted at this temperature. Fractions 2-6, at 75, 80, 85, 90 and 94° C., correspond to component C, and fractions 7 and 8, at 98 and 102° C., correspond to component A. The makeup of the composition was therefore as follows
principal component A: 17.9% by weight
ancillary component B: 18.7% by weight, and
ancillary component C: 62.1% by weight.
The difference Z was therefore 1.3% by weight.

Example 3

An extruder was used to prepare a mixture of two propylene polymers. The components used for the mixture were a propylene homopolymer obtained by metallocene catalysis with a melt flow rate MFR of 1 g/10 min, and a melting point $T_m$ of 150° C., and a ratio $M_w/M_n$ of 1.8, and a propylene-ethylene copolymer of random structure obtained by metallocene catalysis, with an ethylene content of 5.0% by weight, and a melt flow rate MFR of 60 g/10 min, a melting point $T_m$ of 139° C., and a ratio $M_w/M_n$ of 1.9. The ratio of the components of the mixture was 80% by weight of the propylene homopolymer and 20% by weight of the propylene-ethylene copolymer. A Werner & Pfleiderer ZSK 57 extruder was used at 230° C. with a throughput of 150 kg/h.
TREF fractionation of the resultant propylene polymer composition gave the makeup as
principal component A: 72.3% by weight
ancillary component B: 13.2% by weight, and
ancillary component C: 13.0% by weight.
The difference Z was therefore 1.5% by weight.

TABLE 7

|  | Example 1 | Example 2 | Comp. Ex. A | Comp. Ex. B | Comp. Ex. C |
|---|---|---|---|---|---|
| Processing latitude [° C.] | 29 | 27 | 5 | 10 | 5 |
| Longitudinal modulus of elasticity [MPa] | 2100 | 2000 | 2200 | 1700 | 1600 |
| Transverse modulus of elasticity [MPa] | 4300 | 4200 | 4500 | 4000 | 3800 |
| Haze [%] | 1.3 | 1.1 | 2.0 | 1.4 | 2.0 |
| $O_2$ permeability [$cm^3$ 100 μm/($m^2$ d bar)] | 430 | 440 | 450 | 420 | 430 |
| $H_2O$ permeability [g 100 μm/($m^2$ d)] | 0.27 | 0.25 | 0.28 | 0.26 | 0.31 |

As the examples and comparative examples show, the novel propylene polymer compositions have a high degree of temperature latitude in processing. In addition, the biaxially stretched films produced from the same have very good transparency. And this is in particular combined with good stiffness and good barrier action with respect to oxygen and water vapor.

We claim:
1. A biaxially stretched film having a longitudinal stretching ratio of at least 1:3 and a transverse stretching ratio of at least 1:5 obtained by biaxially stretching a semicrystalline propylene polymer composition with a melting point $T_M$ of from 135 to 165° C.,
where the melting point $T_M$ is measured by differential scanning calorimetry (DSC) to ISO 3146 by heating a previously melted specimen at a heating rate of 20° C/min, and is the maximum of the resultant curve,
where the semicrystalline propylene polymer composition can be broken down into
from 65 to 85% by weight of a principal component A,
from 10 to 35% by weight of an ancillary component B and
from 0 to 25% by weight of an ancillary component C,
where the proportions of component A, B and C are determined by carrying out TREF (temperature rising elution fractionation) in which the polymers are firstly dissolved in boiling xylene and the solution is then cooled at a cooling rate of 10° C/h to 25° C., and then, as the temperature rises, that fraction of the propylene polymer composition which is soluble in xylene at $(T_M/2)+7.5°$ C. is firstly dissolved and separated off from the remaining solid, and then, as the temperature rises, at all of the higher temperatures 70° C., 75° C., 80° C., 85° C., 90° C., 95° C., 98° C., 102° C., 107° C., 112° C., 117° C., 122° C. and 125° C., the fractions soluble within the temperature range between this elution temperature and the preceding elution temperature are eluted, and the fractions taken into consideration during the evaluation which follows are those whose proportion by weight is at least 1% by weight of the initial weight of the propylene polymer composition, and gel permeation chromatography (GPC) at 145° C. in 1,2,4-trichlorobenzene is used to measure the molar mass distribution of all of the fractions to be taken into consideration, and
the principal component A is formed by all of the fractions which are to be taken into consideration and are eluted at above $(T_M/2)+7.5°$ C. and have an average molar mass $M_N$ (number average) $\geq 120,000$ g/mol,
the ancillary component B is formed by the fraction which is eluted at $(T_M/2)+7.5°$ C., and
the ancillary component C is formed by all of the fractions which are to be taken into consideration and are eluted at above $(T_M/2)+7.5°$ C. and have an average molar mass $M_N$ (number average) $<120,000$ g/mol, and
where at least 50 mol % of the resultant monomer units stem from the polymerization of propylene,
which process comprises polymerizing propylene, alone or together with ethylene and/or $C_4$-$C_{18}$-1-alkenes, using a catalyst system with only one metallocene catalyst, and conducting the polymerization in a reactor cascade composed of at least two reactors.
2. The biaxially stretched film according to claim 1, where at least 85 mol % of the monomer units present in the semicrystalline propylene polymer composition stem from polymerization of propylene.

3. The biaxially stretched film according to claim 1, wherein the semicrystalline propylene polymer composition is prepared by homopolymerization of propylene or by copolymerization of propylene and ethylene.

4. The biaxially stretched film according to claim 1, wherein the metallocene catalyst used comprises a compound selected from the group consisting of
dimethylsilanediylbis(2-methylindenyl)zirconium dichloride,
dimethylsilanediylbis(2-methylbenzindenyl)]zirconium dichloride,
dimethylsilanediylbis(2-methyl-4-phenylindenyl)zirconium dichloride,
dimethylsilanediylbis(2-methyl-4[4'-tert-butylphenyl]-indenyl)-zirconium dichloride,
dimethylsilanediylbis(2-ethyl-4[4'-tert-butylphenyl]-indenyl)-zirconium dichloride,
dimethylsilanediylbis(2-propyl-4[4'-tert-butylphenyl]-indenyl)-zirconium dichloride,
dimethylsilanediyl(2-isopropyl-4[4'-tert-butylphenyl]-indenyl) (2-methyl-4[4'-tert-butylphenyl]-indenyl)-zirconium dichloride.

5. The biaxially stretched film according to claim 2, wherein the semicrystalline propylene polymer composition is prepared by homopolymerization of propylene or by copolymerization of propylene and ethylene.

6. The biaxially stretched film according to claim 5, wherein the metallocene catalyst used comprises a compound selected from the group consisting of
dimethylsilanediylbis(2-methylindenyl)zirconium dichloride,
dimethylsilanediylbis(2-methylbenzindenyl)]zirconium dichloride,
dimethylsilanediylbis(2-methyl-4-phenylindenyl)zirconium dichloride,
dimethylsilanediylbis(2-methyl-4[4'-tert-butylphenyl]-indenyl)-zirconium dichloride,
dimethylsilanediylbis(2-ethyl-4[4'-tert-butylphenyl]-indenyl)-zirconium dichloride,
dimethylsilanediylbis(2-propyl-4[4'-tert-butylphenyl]-indenyl)-zirconium dichloride,
dimethylsilanediyl(2-isopropyl-4[4'-tert-butylphenyl]-indenyl)(2-methyl-4[4'-tert-butylphenyl]-indenyl)-zirconium dichloride.

7. The biaxially stretched film according to claim 2, wherein the metallocene catalyst used comprises a compound selected from the group consisting of
dimethylsilanediylbis(2-methylindenyl)zirconium dichloride,
dimethylsilanediylbis(2-methylbenzindenyl)]zirconium dichloride,
dimethylsilanediylbis(2-methyl-4-phenylindenyl)zirconium dichloride,
dimethylsilanediylbis(2-methyl-4[4'-tert-butylphenyl]-indenyl)-zirconium dichloride,
dimethylsilanediylbis(2-ethyl-4[4'-tert-butylphenyl]-indenyl)-zirconium dichloride,
dimethylsilanediylbis(2-propyl-4[4'-tert-butylphenyl]-indenyl)-zirconium dichloride,
dimethylsilanediyl(2-isopropyl-4[4'-tert-butylphenyl]-indenyl)(2-methyl-4[4'-tert-butylphenyl]-indenyl)-zirconium dichloride.

8. The biaxially stretched film according to claim 3, wherein the metallocene catalyst used comprises a compound selected from the group consisting of
dimethylsilanediylbis(2-methylindenyl)zirconium dichloride,
dimethylsilanediylbis(2-methylbenzindenyl)]zirconium dichloride,
dimethylsilanediylbis(2-methyl-4-phenylindenyl)zirconium dichloride,
dimethylsilanediylbis(2-methyl-4[4'-tert-butylphenyl]-indenyl)-zirconium dichloride,
dimethylsilanediylbis(2-ethyl-4[4'-tert-butylphenyl]-indenyl)-zirconium dichloride,
dimethylsilanediylbis(2-propyl-4[4'-tert-butylphenyl]-indenyl)-zirconium dichloride,
dimethylsilanediyl(2-isopropyl-4[4'-tert-butylphenyl]-indenyl)(2-methyl-4[4'-tert-butylphenyl]-indenyl)-zirconium dichloride.

* * * * *